(12) United States Patent
Mano et al.

(10) Patent No.: US 12,668,174 B2
(45) Date of Patent: Jun. 30, 2026

(54) VEHICLE HEADLIGHT

(71) Applicant: KOITO MANUFACTURING CO., LTD., Tokyo (JP)

(72) Inventors: Mitsuharu Mano, Shizuoka (JP); Toshiyuki Tsuchiya, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 224 days.

(21) Appl. No.: 18/711,701

(22) PCT Filed: Nov. 22, 2022

(86) PCT No.: PCT/JP2022/043095
§ 371 (c)(1),
(2) Date: Dec. 12, 2024

(87) PCT Pub. No.: WO2023/095767
PCT Pub. Date: Jun. 1, 2023

(65) Prior Publication Data
US 2025/0326352 A1 Oct. 23, 2025

(30) Foreign Application Priority Data
Nov. 24, 2021 (JP) ................................. 2021-190275

(51) Int. Cl.
*B60Q 1/14* (2006.01)
*H05B 45/18* (2020.01)
*H05B 47/17* (2020.01)

(52) U.S. Cl.
CPC ............. *B60Q 1/143* (2013.01); *H05B 45/18* (2020.01); *H05B 47/17* (2020.01); *B60Q 2300/146* (2013.01)

(58) Field of Classification Search
CPC .............. B60Q 1/143; B60Q 2300/112; B60Q 2300/146; F21S 41/153; F21S 45/10; H05B 45/18; H05B 47/155; H05B 47/17
See application file for complete search history.

(56) References Cited

U.S. PATENT DOCUMENTS

| | | | |
|---|---|---|---|
| 11,414,007 B2 * | 8/2022 | Kanazawa ............. | F21S 41/151 |
| 2008/0158360 A1 * | 7/2008 | Katou .................... | B60Q 1/143 |
| | | | 348/148 |

(Continued)

FOREIGN PATENT DOCUMENTS

| | | | |
|---|---|---|---|
| JP | 2006282044 A | * | 10/2006 |
| JP | 2015-016702 A | | 1/2015 |

(Continued)

OTHER PUBLICATIONS

Machine Translation JP2006282044A (Year: 2006).*
International Search Report for PCT/JP2022/043095, dated Dec. 27, 2022.

*Primary Examiner* — Raymond R Chai
(74) *Attorney, Agent, or Firm* — Sughrue Mion, PLLC

(57) ABSTRACT

A vehicle headlight (1) includes: a second light source unit (40) that includes second light emitting units (43); an actuator (50) that adjusts a direction of light emitted from the second light source unit (40); and a controller (CO), in which the controller (CO) switches the second light emitting unit (43) that emits the light having the highest intensity to another second light emitting unit (43), and controls the actuator (50) to change a direction of second light emitted from the second light source unit (40) in such a way that a region (110) where the intensity of the light is highest in a light distribution pattern (103) after the switching approaches a region (110) where the intensity of the light is highest in the light distribution pattern (103) before the switching.

4 Claims, 8 Drawing Sheets

(56)     References Cited

U.S. PATENT DOCUMENTS

2014/0361685  A1     12/2014  Yamamich et al.
2018/0242421  A1      8/2018  Ohta et al.
2021/0156536  A1 *    5/2021  Adams ..................... B60Q 1/18

FOREIGN PATENT DOCUMENTS

JP        2018-134981  A     8/2018
JP        2019-089494  A     6/2019

* cited by examiner

FIG. 1

VEHICLE HEADLIGHT

CROSS REFERENCE TO RELATED APPLICATIONS

This application is a National Stage of International Application No. PCT/JP2022/043095 filed Nov. 22, 2022, claiming priority based on Japanese Patent Application No. 2021-190275 filed Nov. 24, 2021.

BACKGROUND ART

A vehicle headlight may include a light source unit including a plurality of light emitting units such as light emitting diodes (LEDs) and a circuit board on which the plurality of light emitting units are mounted. In such a vehicle headlight, when the temperature of the light source unit becomes a predetermined value or more, the duty ratio of the light emitting unit may be decreased according to the temperature. When the duty ratio is decreased, the amount of heat generated from the light emitting unit is reduced, so that the light emitting unit is protected from heat. Such control of the duty ratio is called temperature derating, and Patent Literature 1 below discloses a lamp that performs temperature derating.

[Patent Literature 1] JP 2018-134981 A

SUMMARY OF INVENTION

In a vehicle headlight, a light emitting unit that emits light having the highest intensity in a light distribution pattern generates heat most among a plurality of light emitting units that emit light for forming the light distribution pattern. In a case where the light emitting unit that emits light having the highest intensity is always the same, the light emitting unit deteriorates earlier than other light emitting units due to heat, and the lifespan of the light emitting unit tends to be shorter than that of the other light emitting units. Therefore, it is conceivable to switch a light emitting unit that emits light having the highest intensity to another light emitting unit when temperature derating is performed or the like to suppress deterioration of a specific light emitting unit due to heat. However, in this case, a relative position in a light distribution pattern of a region where the intensity of the light is highest in the light distribution pattern moves, and a driver tends to feel uncomfortable.

Therefore, an object of the present invention is to provide a vehicle headlight capable of achieving uniformization of lifespans of light emitting units and suppressing discomfort felt by a driver.

In order to achieve the above object, a vehicle headlight according to the present invention includes: a light source unit that includes a plurality of light emitting units that emit light for forming a light distribution pattern to a front of a vehicle; an actuator that adjusts a direction of the light emitted from the light source unit; and a controller, in which the controller switches the light emitting unit that emits the light having a highest intensity to another light emitting unit, and controls the actuator to change the direction of the light emitted from the light source unit in such a way that a region where the intensity of the light is highest in the light distribution pattern after the switching approaches a region where the intensity of the light is highest in the light distribution pattern before the switching.

With the above configuration, it is possible to suppress concentration of heat on a specific light emitting unit before the switching as compared with a case where the light emitting unit that emits light having the highest intensity is always the same without being switched to another light emitting unit. Therefore, it is possible to prevent a specific light emitting unit from deteriorating earlier than the other light emitting units due to heat, and the lifespans of the respective light emitting units can be uniformized. In addition, when the light emitting unit that emits the light having the highest intensity is switched to another light emitting unit, the relative position of the region where the intensity of the light is highest in the light distribution pattern moves. Therefore, in the above configuration, the controller controls the actuator to change the direction of the light emitted from the light source unit in such a way that the region where the intensity of the light is highest in the light distribution pattern after the switching approaches the region where the intensity of the light is highest in the light distribution pattern before the switching. As a result, the region after the switching approaches the region before the switching, and thus, it is possible to suppress the driver from feeling uncomfortable due to the movement of the region in the light distribution pattern.

The controller may switch the light emitting unit that emits the light having the highest intensity to another light emitting unit when performing temperature derating on the light source unit based on a temperature of the light source unit.

With the above configuration, the light distribution pattern can be suppressed from becoming dark even when the temperature derating is performed, as compared with a case where the temperature derating is performed, and the region does not move and becomes dark.

The controller may switch the light emitting unit that emits the light having the highest intensity to another light emitting unit that is located farther away from the light emitting unit as a temperature of the light source unit is higher.

With the above configuration, heat can be easily dispersed in the light source unit. By dispersing heat in this manner, concentration of heat in the light source unit can be suppressed, deterioration of the light emitting unit located in a portion where heat is concentrated due to heat can be suppressed, and the lifespans of the light emitting units can be uniformized.

The plurality of light emitting units may be arranged in a matrix, and the light may form an additional light distribution pattern to be added to a low beam light distribution pattern to form a high beam light distribution pattern.

As described above, according to the present invention, it is possible to provide a vehicle headlight capable of achieving uniformization of lifespans of light emitting units and suppressing discomfort felt by a driver.

BRIEF DESCRIPTION OF DRAWINGS

FIG. 1 is a schematic diagram illustrating a vehicle including a vehicle headlight according to an embodiment of the present invention.

DESCRIPTION OF EMBODIMENTS

Figure 2:
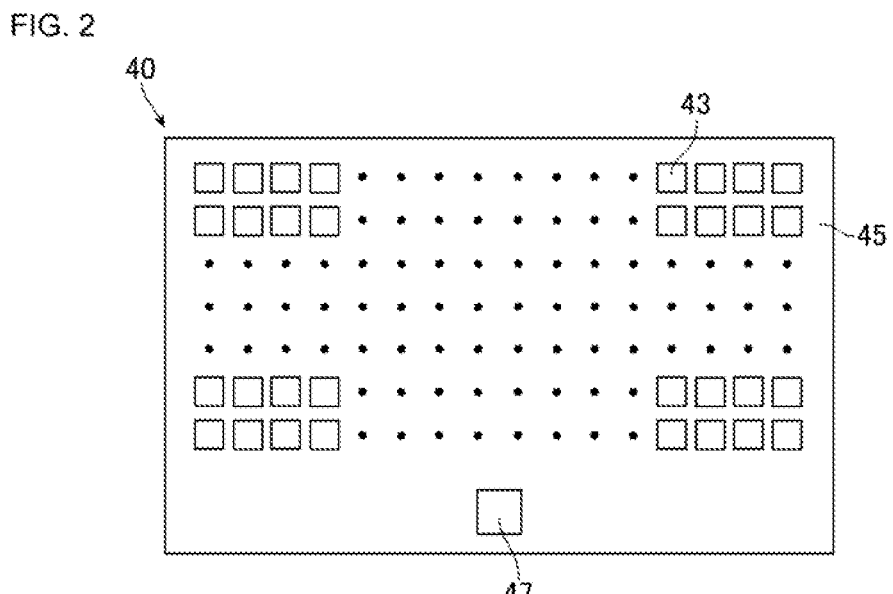
FIG. 2 is a front view schematically illustrating a second light source unit.

Hereinafter, a preferred embodiment of a vehicle headlight according to the present invention will be described in detail with reference to the drawings. Embodiments exemplified below are intended to facilitate understanding of the present invention and are not intended to limit the present invention. The present invention can be changed and modified without departing from the gist of the present invention. In the present invention, constituent elements in the following embodiments may be appropriately combined. In the drawings referred to below, dimensions of each member may be changed for easy understanding.

Figure 1:
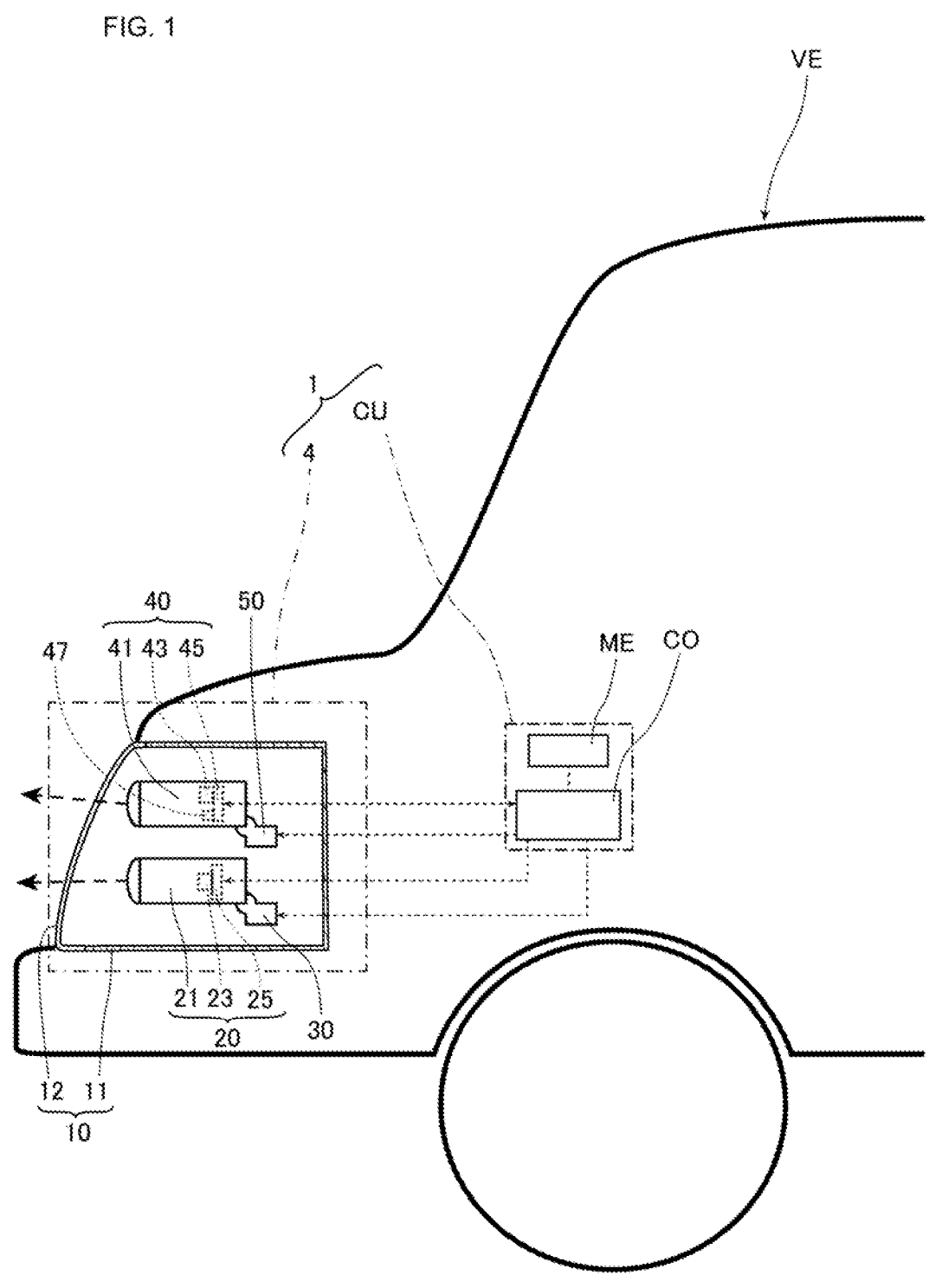

FIG. 1 is a schematic diagram illustrating a vehicle including a vehicle headlight according to the present embodiment. As illustrated in FIG. 1, a vehicle headlight 1 according to the present embodiment includes a lamp unit 4 and a control unit CU. The vehicle headlight 1 is for an automobile and is generally provided at each of left and right portions on a front side of a vehicle VE. In the present specification, "right" refers to a right side of the vehicle VE in a forward movement direction, and "left" refers to a left side of the vehicle VE in the forward movement direction. Each of the left and right vehicle headlights 1 has the same configuration except that shapes thereof are substantially symmetrical to each other in a horizontal direction. Therefore, one vehicle headlight 1 will be described below.

The lamp unit 4 is disposed on the front side of the vehicle VE, and includes a casing 10, a first light source unit 20, an actuator 30, a second light source unit 40, a temperature sensor 47, and an actuator 50 as main components.

The casing 10 mainly includes a housing 11 and an outer cover 12. The housing 11 is formed in a box shape having an opening on a front side, and the outer cover 12 is fixed to the housing 11 in such a way as to close the opening. In this way, an accommodation space surrounded by the housing 11 and the outer cover 12 is formed in the casing 10, and the first light source unit 20, the actuator 30, the second light source unit 40, the temperature sensor 47, and the actuator 50 are disposed in the accommodation space. The outer cover 12 transmits light emitted from each of the first light source unit 20 and the second light source unit 40. The control unit CU is disposed outside the casing 10, and may be disposed in the accommodation space of the casing 10.

The first light source unit 20 emits first light for forming a low beam light distribution pattern to the front of the vehicle VE. The first light source unit 20 mainly includes a first casing 21 having the same configuration as the casing 10, and a plurality of first light emitting units 23 and a first circuit board 25 disposed in an accommodation space of the first casing 21. In the accommodation space of the first casing 21, an optical member such as a reflector or a projection lens, a shade, or the like may be disposed in such a way that the first light forms the low beam light distribution pattern.

Examples of each of the first light emitting units 23 include a light emitting diode (LED). Such first light emitting units 23 are arranged in a matrix and arranged in the vertical direction and the horizontal direction. In FIG. 1, the first light emitting units 23 arranged in this manner are simply illustrated for clarity of illustration. The number of first light emitting units 23 is 256 in the horizontal direction and 64 in the vertical direction, but the number of first light emitting units 23 is not particularly limited. The first light emitting units 23 are micro LEDs, and are preferably a so-called micro LED array. The first light emitting unit 23 is mounted on the first circuit board 25. When power is supplied from a power supply unit (not illustrated) via the first circuit board 25, the first light emitting unit 23 emits the first light forward. The controller CO can perform control to individually change whether or not to emit the first light from the first light emitting unit 23 and change the light emission amount.

The actuator 30 is connected to the first casing 21, and is configured to be able to change inclinations of the first light source unit 20 in the vertical and horizontal directions. The inclination of the first light source unit 20 in the vertical direction is changed by the actuator 30 in a range of, for example, 0.01 degrees to 5 degrees. The inclination of the first light source unit 20 in the horizontal direction is changed by the actuator 50 in a range of, for example, 1 degree to 30 degrees. The actuator 30 adjusts a direction of the first light emitted from the first light source unit 20 by changing the inclination of the first light source unit 20. Inclinations of the first light and the low beam light distribution pattern in the vertical and horizontal directions are changed according to a change amount of the inclination of the first light source unit 20.

The second light source unit 40 emits second light for forming an additional light distribution pattern to be added to the low beam light distribution pattern to form a high beam light distribution pattern. The second light source unit 40 mainly includes a second casing 41 having the same configuration as the casing 10, and a plurality of second light emitting units 43 and a second circuit board 45 disposed in an accommodation space of the second casing 41. In the accommodation space of the second casing 41, an optical member such as a reflector or a projection lens, a shade, or the like may be disposed in such a way that the second light forms the additional light distribution pattern similarly to the first casing 21. In FIG. 1, only one second light emitting unit 43 is illustrated for clarity of illustration. The second light emitting unit 43 and the second circuit board 45 are described below with reference to FIG. 2.

The actuator 50 is connected to the second casing 41, and is configured to be able to change inclinations of the second light source unit 40 in the vertical and horizontal directions. The inclinations of the second light source unit 40 in the vertical and horizontal directions are changed by the actuator 50 in the same range as the range of the inclinations of the first light source unit 20 in the vertical and horizontal directions. The actuator 50 adjusts a direction of the second light emitted from the second light source unit 40 by changing the inclination of the second light source unit 40. Then, inclinations of the second light and the additional light distribution pattern in the vertical and horizontal directions are changed according to a change amount of the inclination of the second light source unit 40.

The control unit CU includes a memory ME and a controller CO.

The memory ME is configured to record information, and the recorded information can be read from the memory ME. The memory ME is, for example, a non-transitory recording medium, and is preferably a semiconductor recording medium such as a random access memory (RAM) or a read only memory (ROM), and can include a recording medium of any format such as an optical recording medium or a magnetic recording medium. Note that the "non-transitory" recording medium includes all computer-readable recording media except for a transitory propagating signal, and does not exclude a volatile recording medium. Note that the memory ME may be provided inside the controller CO.

The controller CO includes, for example, an integrated circuit such as a microcontroller, an integrated circuit (IC), a large-scale integrated circuit (LSI), or an application specific integrated circuit (ASIC), or a numerical control (NC) device. In addition, in a case where the NC device is used, the controller CO may use a machine learning device or does not have to use a machine learning device. The controller CO controls some components of the vehicle headlight 1.

The controller CO is electrically connected to the actuators 30 and 50, and controls the actuators 30 and 50 to adjust the inclination of the first light source unit 20 in the vertical direction and the inclinations of the second light source unit 40 in the vertical and horizontal directions. By adjusting the inclinations, the inclination of each of the first light emitted from the first light source unit 20, the second light emitted from the second light source unit 40, the low beam light distribution pattern, the additional light distribution pattern, and the high beam light distribution pattern is adjusted.

The controller CO is electrically connected to the first light source unit 20 and the second light source unit 40 via the power supply unit (not illustrated), and controls the first light source unit 20 and the second light source unit 40. That is, the controller CO controls whether or not to emit each of the first light and the second light and adjusts the intensity of each light.

The controller CO adjusts power to be supplied to the first light emitting unit 23 and the second light emitting unit 43 by, for example, pulse width modulation (PWM) control. In this case, the controller CO adjusts the power to be supplied to each of the first light emitting unit 23 and the second light emitting unit 43 by adjusting a duty ratio of each of the first light emitting unit 23 and the second light emitting unit 43, and adjusts a light emission amount of each of the first light emitting unit 23 and the second light emitting unit 43 by adjusting the power. The greater the duty ratio, the greater the power applied to each of the first light emitting unit 23 and the second light emitting unit 43. A light intensity distribution in each of the low beam light distribution pattern and the additional light distribution pattern is adjusted by adjusting the light emission amount.

FIG. 2 is a front view schematically illustrating the second light source unit 40. In FIG. 2, illustration of the second casing 41 is omitted.

Each of the second light emitting units 43 may be, for example, a micro LED, similarly to the first light emitting unit 23. Therefore, the second light emitting units 43 are arranged in a matrix. Such second light emitting units 43 have the same number and the same arrangement as those of the first light emitting units 23, but are not limited thereto. When power is supplied from the power supply unit (not illustrated) via the second circuit board 45, the second light emitting unit 43 emits the second light forward. The controller CO can perform control to individually change whether or not to emit the second light from the second light emitting unit 43 and change the light emission amount.

Each of the second light emitting units 43 generates heat when emitting the second light. The heat of each of the second light emitting units 43 is transferred to the second circuit board 45. As the supplied power increases, a light emission amount and a heat generation amount of each of the second light emitting units 43 increase, and a temperature of the second light source unit 40 increases. Since a heat generation amount of the second circuit board 45 is extremely smaller than the total heat generation amount of the second light emitting units 43, the temperature of the second light source unit 40 can be regarded as a temperature based on the total heat generation amount of the second light emitting units 43.

The temperature sensor 47 is mounted on the second circuit board 45 and estimates the temperature of the second light source unit 40. Examples of such a temperature sensor 47 include a thermistor. The temperature sensor 47 is electrically connected to the controller CO, and outputs a temperature signal related to the estimated temperature to the controller CO. The temperature sensor 47 according to the present embodiment is disposed away from each of the second light emitting units 43, and the temperature of the heat of each of the second light emitting units 43*a* to 43*h* may decrease when the heat of each of the second light emitting units 43 is transferred to the temperature sensor 47. Therefore, the controller CO may estimate the temperature of the second light source unit 40 based on the temperature signal output from the temperature sensor 47 and a distance between each of the second light emitting units 43 and the temperature sensor 47.

A configuration and attachment position of the temperature sensor 47 are not particularly limited as long as the temperature sensor 47 can estimate the temperature of the second light source unit 40. For example, the temperature sensor 47 may be disposed in the accommodation space of the second casing 41, may be attached to each of the second light emitting units 43, or may be mounted on another circuit board electrically connected to the second circuit board 45. Further, the controller CO may estimate the temperature of the second light source unit 40 based on the amount of power of each of the second light emitting units 43.

As described above, the second light emitting unit 43 generates heat when emitting the second light. The temperature of the second light source unit 40 associated with the heat generation of the second light emitting units 43 is estimated by the temperature sensor 47 as described above, and the temperature sensor 47 outputs the temperature signal to the controller CO. The controller CO performs temperature derating on the second light emitting unit 43 of the second light source unit 40 based on the temperature signal.

Next, the temperature derating in the second light source unit 40 will be described. The controller CO does not perform the temperature derating when the temperature T estimated by the second light source unit 40 is lower than a temperature T1, such as 80° C., which is a predetermined value at the time of starting the temperature derating. The controller CO performs the temperature derating when the temperature T is equal to or higher than the temperature T1. When the temperature T is the temperature T1, the controller CO supplies, to the second light emitting unit 43, power E1 smaller than power supplied when the temperature derating is not performed. In this case, the controller supplies the power E1 to the second light emitting unit 43 to which power larger than the power E1 is supplied among the plurality of second light emitting units 43, and decreases the power to be supplied to the second light emitting unit 43. When the temperature T is a temperature T2 higher than the temperature T1, the controller CO supplies, to the second light emitting unit 43, power E2 smaller than the power E1. In this case, the controller supplies the power E2 to the second light emitting unit 43 to which power larger than the power E2 is supplied among the plurality of second light emitting units 43, and deceases the power to be supplied to the second light emitting unit 43. When the temperature T1 is 80° C., the temperature T2 is, for example, 120° C. When the temperature T is higher than the temperature T1 and lower than the temperature T2, the controller CO supplies, to the second light emitting unit 43, power smaller than the power E1 and larger than the power E2. When the temperature T is higher than the temperature T2, the controller CO supplies the power E2 to the second light emitting unit 43, for example, in order to avoid turning off the light. As described above, the controller CO controls the power E according to the temperature T when the temperature T is equal to or higher than the temperature T1. When the power E is decreased, the light emission amount and the heat generation amount of each of the second light emitting units 43 decrease, and the temperature of the second light source unit 40 decreases.

Next, an operation of the vehicle headlight 1 will be described.

Figure 3:
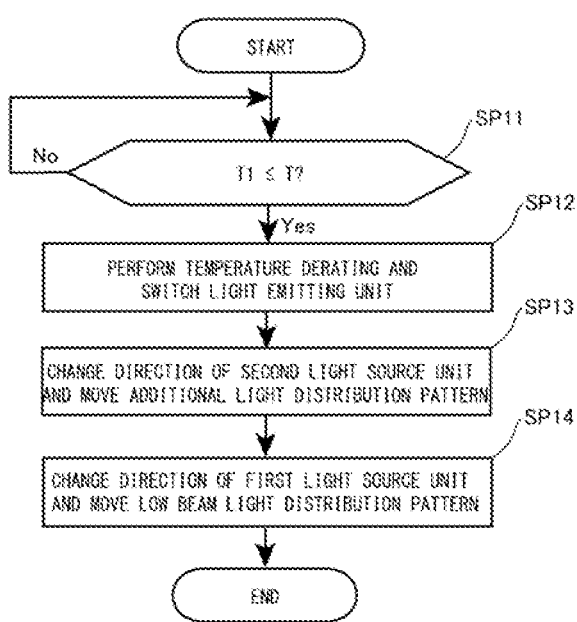
FIG. 3 is a diagram illustrating an example of a control flowchart of a controller according to the embodiment.

FIG. 3 is a diagram illustrating an example of a control flowchart of the controller CO according to the embodiment. As illustrated in FIG. 3, the control flow according to the present embodiment includes steps SP11 to SP14. Note that the control flow is not limited thereto. In the state of start illustrated in FIG. 3, it is assumed that the first light and the second light are emitted and the high beam light distribution pattern is formed. In addition, in the state of start, it is assumed that the temperature sensor 47 estimates the temperature of the second light source unit 40 and the temperature signal is input to the controller CO.

(Step SP11)

In this step, in a case where the temperature T indicated by the temperature signal output from the temperature sensor 47 is lower than the temperature T1 which is the predetermined value, the controller CO repeats step SP11. In a case where the temperature T is equal to or higher than the temperature T1, the controller CO advances the control flow to step SP12.

(Step SP12)

In this step, the controller CO performs the temperature derating on the second light source unit 40, and switches the second light emitting unit 43 that emits the second light having the highest intensity.

Among the plurality of second light emitting units 43 before the temperature derating, the largest power is supplied to a second light emitting unit 43 that emits the second light forming a region 110 described below, that is, a second light emitting unit 43 that emits the second light having the highest intensity, and the corresponding second light emitting unit 43 generates the most heat. In this step, the controller CO supplies the largest power to a second light emitting unit 43 different from the second light emitting unit 43 to which the largest power is supplied before the temperature derating. Next, the controller CO decreases the power to be supplied to the second light emitting unit 43 to which the largest power is supplied before the temperature derating by the temperature derating. For example, when the temperature T is the temperature T2, the controller CO decreases power to be supplied to the second light emitting unit 43 to which power larger than the power E2 is supplied, to the power E2. As a result, the heat generation amount of the second light source unit 40 decreases, and the temperature of the second light source unit 40 decreases. In addition, as compared with a case where the controller CO decreases the power first by the temperature derating, the additional light distribution pattern is suppressed from becoming bright after becoming dark, and deterioration in visibility is suppressed.

The controller CO may decrease power to be supplied to the second light emitting unit 43 to which the largest power is supplied before the temperature derating by the temperature derating, and then supply the largest power to a second light emitting unit 43 different from the second light emitting unit 43. Alternatively, the controller CO may decrease power to be supplied to the second light emitting unit 43 to which the largest power is supplied before the temperature derating by the temperature derating, and simultaneously supply the largest power to a second light emitting unit 43 different from the second light emitting unit 43.

As described above, in this step, as the temperature derating is performed, the controller CO switches the second light emitting unit 43 to which the largest power is supplied from the second light emitting unit 43 to which the largest power is supplied before the temperature derating to another second light emitting unit 43. Therefore, this step is a step of switching the second light emitting unit 43 that emits the second light having the highest intensity to another second light emitting unit 43.

Figure 4:
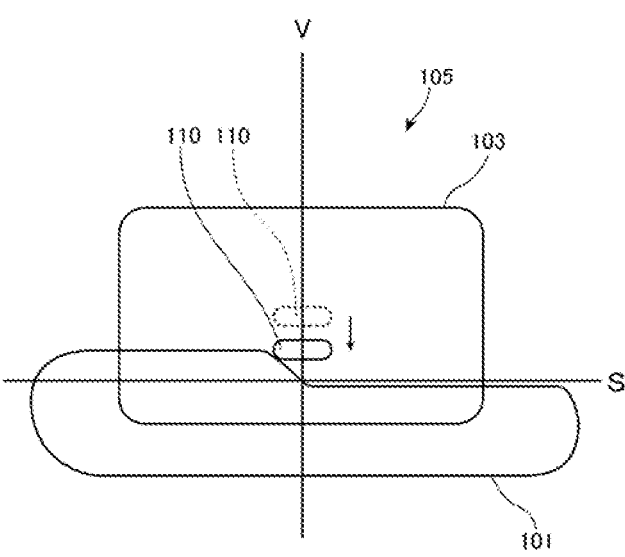
FIG. 4 is a view illustrating a change of a position of a region in an additional light distribution pattern in step SP12.

FIG. 4 is a view illustrating a change of a position of the region 110 in the additional light distribution pattern 103 in the high beam light distribution pattern 105 formed by the low beam light distribution pattern 101 and the additional light distribution pattern 103 in this step. The light distribution patterns 101, 103, and 105 illustrated in FIG. 4 mean both shapes of images formed on a virtual vertical screen, for example, 25 m ahead of the vehicle VE, and light intensity distributions in the images.

The region 110 is a region having the highest intensity of the second light in the additional light distribution pattern 103, and may also be referred to as a hot zone. The region 110 is formed by the second light having the highest intensity emitted from the second light emitting unit 43 to which the largest power is supplied. In FIG. 4, the region 110 is illustrated as having a rounded rectangular shape, but the shape and size of the region 110 are not particularly limited. An intensity distribution of the second light in the additional light distribution pattern 103 is, for example, a distribution in which the intensity decreases as the distance from the region 110 increases. The controller CO adjusts power to be supplied to each of the second light emitting units 43 in such a way that the intensity of the second light in the additional light distribution pattern 103 has such a distribution, and adjusts the light emission amount of each of the second light emitting units 43 by the power adjustment.

The region 110 is moved by the switching of the second light emitting unit 43 described above. In FIG. 4, the region 110 before the movement is indicated by a broken line, and the region 110 after the movement is indicated by a solid line. The region 110 after the movement is located above an intersection of a horizontal line S and a vertical line V and is closer to the intersection than the region 110 before the movement. FIG. 4 illustrates an example in which a relative position of the region 110 after the movement in the additional light distribution pattern 103 is lowered. The shape of the additional light distribution pattern 103 is a light distribution pattern formed by vertically and horizontally reversing the second light emitted from each of the second light emitting units 43. Therefore, the second light emitting unit 43 that emits the second light forming the region 110 indicated by the broken line in FIG. 4 is located above the second light emitting unit 43 that emits the second light forming the region 110 indicated by the solid line in FIG. 4.

Therefore, the controller CO switches the second light emitting unit 43 that emits the second light having the highest intensity from the second light emitting unit 43 that emits the second light forming the region 110 indicated by the broken line to the second light emitting unit 43 located above the second light emitting unit 43 that emits the second light forming the region 110 indicated by the broken line.

In this step, as the temperature T of the second light source unit 40 is higher, the controller CO may switch the second light emitting unit 43 that emits the second light having the highest intensity to another second light emitting unit 43 that is located farther away from the second light emitting unit 43. With the above configuration, heat can be easily dispersed in the second light source unit 40. By dispersing heat in this manner, concentration of heat in the second light source unit 40 can be suppressed, deterioration of the second light emitting unit 43 located in a portion where heat is concentrated due to heat can be suppressed, and the lifespans of the second light emitting units 43 can be uniformized. As the temperature T of the second light source unit 40 is higher, the controller CO does not have to perform switching to another second light emitting unit 43 that is located farther away.

Once the second light emitting unit 43 is switched, the controller CO advances the control flow to step SP13.
(Step SP13)

In this step, the controller CO controls the actuator 50 in such a way that the region 110 after the switching of the second light emitting unit 43 approaches the position of the region 110 before the switching, changes the direction of the second light emitted from the second light source unit 40, and moves the additional light distribution pattern 103. In the present embodiment, the region 110 is lowered in step SP12, and thus, the controller CO inclines the entire second light source unit 40 upward, for example, and moves a lower edge and an upper edge of the additional light distribution pattern 103 upward by the same movement amount. The controller CO controls the actuator 50 within, for example, one second after the end of the movement of the region 110 in step SP12. The controller CO may control the actuator 50 simultaneously with the end of the movement or during the switching of the second light emitting unit 43 in step SP12, and a timing of performing the control is not particularly limited.

Figure 5:
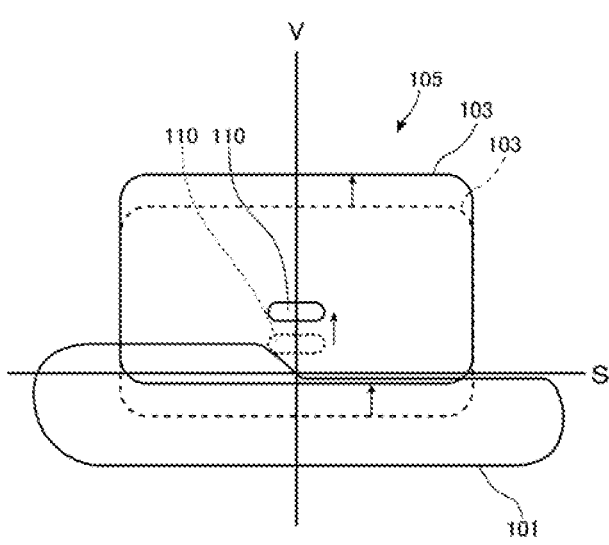
FIG. 5 is a view illustrating a change of the additional light distribution pattern in step SP13.

FIG. 5 is a view illustrating a change of the additional light distribution pattern 103 in this step. In FIG. 5, the additional light distribution pattern 103 before the movement is indicated by a broken line, and the additional light distribution pattern 103 after the movement is indicated by a solid line. In this step, the controller CO moves the additional light distribution pattern 103 in such a way that the additional light distribution pattern 103 visually overlaps with the low beam light distribution pattern 101 when viewed by a human.

The region 110 is also moved by the movement of the additional light distribution pattern 103. FIG. 5 illustrates an example in which the region 110 before the movement is indicated by a broken line, the region 110 after the movement is indicated by a solid line, and the region 110 after the movement is returned to the position of the region 110 before the movement indicated by the broken line described in FIG. 4 and step SP12. Therefore, the region 110 after the movement is located at the same position as an absolute position of the region 110 before the movement in the vertical and horizontal directions in the additional light distribution pattern 103 illustrated in FIG. 4 before the temperature derating and before the movement, the absolute position being indicated by the broken line in FIG. 4. This prevents the driver from feeling uncomfortable due to the movement of the region 110 in step SP12 in the additional light distribution pattern 103. The region 110 after the movement only needs to be brought close to the absolute position of the region 110 in the vertical direction in the additional light distribution pattern 103 before the movement indicated by the broken line in FIG. 4, and may be located above or below the position. In this step, as described above, the controller CO may change the direction of the second light emitted from the second light source unit 40 during the switching of the second light emitting unit 43. As a result, a deviation of the absolute position of the region 110 in the vertical direction is suppressed, and the driver can be further suppressed from feeling uncomfortable due to the movement of the region 110 in the additional light distribution pattern 103.

In this step, the controller CO may increase a change amount of a direction of the second light source unit 40 according to the traveling speed of the vehicle VE. In this case, for example, information related to the speed is input to the controller CO from an electronic control unit (ECU) (not illustrated) of the vehicle VE, and the controller CO uses the information. With the above configuration, when the vehicle VE travels fast, the movement amount of the upper edge is larger than that when the vehicle VE travels slow, and thus, a driver can visually recognize a far place in a bright state, so that the safety can be improved. The controller CO does not have to increase the change amount of the direction of the second light source unit 40 according to the traveling speed of the vehicle VE.

Further, in this step, the controller CO may increase a change speed of the direction of the second light source unit 40 according to the traveling speed of the vehicle VE. With the above configuration, when the vehicle VE travels fast, the movement speed of the upper edge is higher than that when the vehicle VE travels slow, and thus, the driver can visually recognize a far place quickly in a bright state, so that the safety can be improved. The controller CO does not have to increase the change speed of the direction of the second light source unit 40 according to the traveling speed of the vehicle VE.

Further, the controller CO may greatly move the additional light distribution pattern 103 upward in step SP12 as the relative position of the region 110 in the additional light distribution pattern 103 is lowered in step SP13. As the position of the region 110 is lowered, an upper edge side of the additional light distribution pattern 103 tends to become dark. Therefore, with the above configuration, the driver can visually recognize a far place in a bright state, and the safety can be improved. The controller CO does not have to greatly move the additional light distribution pattern 103 upward as the position of the region 110 is lowered.

Once the additional light distribution pattern 103 is moved upward, the controller CO advances the control flow to step SP14.
(Step SP14)

Figure 6:
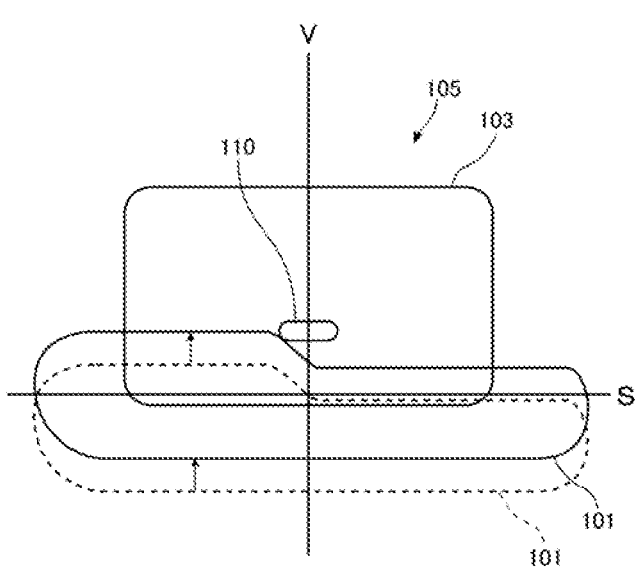
FIG. 6 is a view illustrating a change of a low beam light distribution pattern in step SP14.

In this step, the controller CO controls the actuator 30 to change the direction of the first light emitted from the first light source unit 20 to the same direction as the direction of the second light emitted from the second light source unit 40, and moves the low beam light distribution pattern 101 in the same direction as the additional light distribution pattern 103. In the present embodiment, since the second light source unit 40 is inclined upward as described above, the controller CO inclines the first light source unit 20 upward. In addition, since the entire first light source unit 20 is inclined upward, the controller CO moves the lower edge and the upper edge of the low beam light distribution pattern 101 upward by the same movement amount. The controller CO moves the low beam light distribution pattern 101, for example, one second after the end of the movement of the additional light distribution pattern 103 in step SP13. However, the low beam light distribution pattern 101 may be moved simultaneously with the end of the movement of the additional light distribution pattern 103, and a timing of the movement is not particularly limited. FIG. 6 is a view illustrating a change of the low beam light distribution pattern 101 in this step. In FIG. 6, the low beam light distribution pattern 101 before the movement is indicated by a broken line, and the low beam light distribution pattern 101 after the movement is indicated by a solid line. Since the low beam light distribution pattern 101 moves in the same direction as the additional light distribution pattern 103, formation of a gap between the additional light distribution pattern 103 and the low beam light distribution pattern 101 in which the first light and the second light can be visually regarded as not overlapping each other by humans is suppressed.

The low beam light distribution pattern 101 may be moved by the same movement amount as that of the additional light distribution pattern 103 in step SP13, or may be moved by a larger movement amount or a smaller movement amount than that of the additional light distribution pattern 103 as long as the formation of the gap is suppressed. In a case where it is not necessary to move the low beam light distribution pattern 101 as described above, the actuator 30 does not have to be provided. Alternatively, this step may be omitted, and the controller CO does not have to move the low beam light distribution pattern 101.

Once the low beam light distribution pattern 101 is moved, the controller CO ends the control flow.

As described above, in the vehicle headlight 1 according to the present embodiment, the controller CO switches the second light emitting unit 43 that emits the second light having the highest intensity to another second light emitting unit 43 as described in FIG. 4 and step SP12, and controls the actuator 50 to change the direction of the second light emitted from the second light source unit 40 in such a way that the region 110 of the additional light distribution pattern 103 after the switching approaches the region 110 of the additional light distribution pattern 103 before the switching as described in FIG. 5 and step SP13.

With the above configuration, it is possible to suppress concentration of heat on a specific second light emitting unit 43 before the switching as compared with a case where the second light emitting unit 43 that emits light having the highest intensity is always the same without being switched to another second light emitting unit 43. Therefore, it is possible to prevent a specific second light emitting unit 43 from deteriorating earlier than the other second light emitting units 43 due to heat, and the lifespans of the respective second light emitting units 43 can be uniformized. In addition, when the second light emitting unit 43 that emits light having the highest intensity is switched to another second light emitting unit 43, the relative position of the region 110 in the additional light distribution pattern 103 moves. Therefore, in the above configuration, the controller CO controls the actuator 50 to change the direction of the second light emitted from the second light source unit 40 as described above. As a result, the region 110 after the switching approaches the region 110 before the switching, and thus, it is possible to suppress the driver from feeling uncomfortable due to the movement of the region 110 in the additional light distribution pattern 103.

In addition, when performing the temperature derating on the second light source unit 40, the controller CO switches the second light emitting unit 43 that emits the second light having the highest intensity to another second light emitting unit 43 as described in FIG. 4 and step SP12.

With the above configuration, the light distribution pattern 103 can be suppressed from becoming dark even when the temperature derating is performed, as compared with a case where the temperature derating is performed, and the region 110 does not move and becomes dark. The controller CO does not need to switch the second light emitting unit 43 in a case of performing the temperature derating on the second light source unit 40. For example, the controller CO may switch the second light emitting unit 43 when a predetermined time elapses.

In addition, as described in FIG. 5 and step SP13, the controller CO controls the actuator 50 to change the direction of the second light emitted from the second light source unit 40 and moves the additional light distribution pattern 103 upward. With the above configuration, the additional light distribution pattern 103 is moved upward, and thus, an area where a line of sight is directed when the driver visually recognizes a far place becomes bright, and deterioration in visibility can be suppressed.

In steps SP12 and SP13, the controller CO may switch the second light emitting unit 43 during a period between the start and the end of the change of the direction of the second light emitted from the second light source unit 40. Alternatively, the controller CO may simultaneously perform steps SP12 and SP13, and simultaneously start or simultaneously end the change of the direction of the second light emitted from the second light source unit 40 and the switching of the second light emitting unit 43. Alternatively, the controller CO may advance the control flow in the order of step SP13, step SP12, and step SP14, change the direction of the second light emitted from the second light source unit 40, move the additional light distribution pattern 103, and then switch the second light emitting unit 43. In this case, the controller CO may switch the second light emitting unit 43, for example, one second after the movement of the additional light distribution pattern 103 or simultaneously with the movement of the additional light distribution pattern 103.

Figure 7:
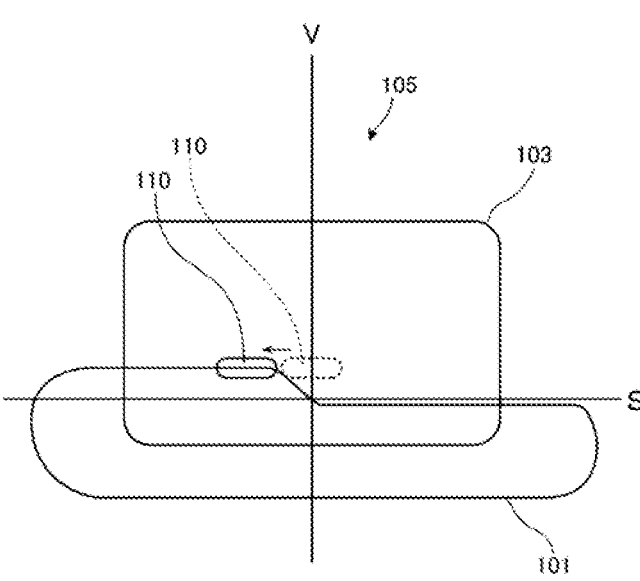
FIG. 7 is a view illustrating a modification of the change of the position of the region in the additional light distribution pattern in step SP12.
Figure 8:
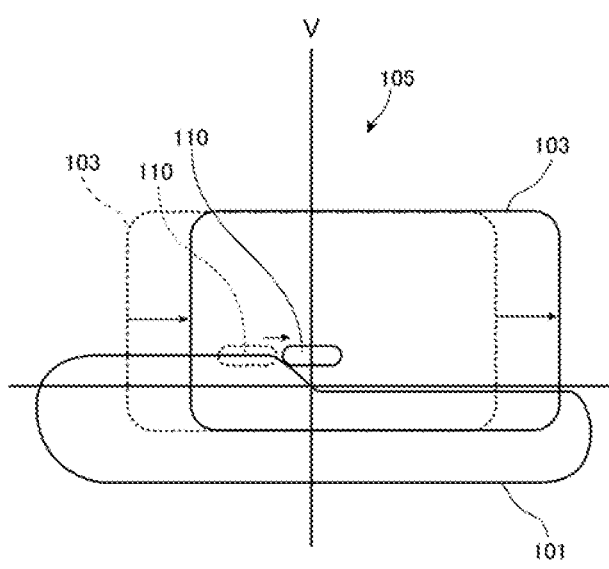
FIG. 8 is a view illustrating a modification of the change of the additional light distribution pattern in step SP13.

As described in FIG. 4 and step SP12, the controller CO moves the region 110 downward, but the present invention is not limited thereto. FIG. 7 is a view illustrating a modification of the change of the position of the region in the additional light distribution pattern in step SP12. FIG. 8 is a view illustrating a modification of the change of the additional light distribution pattern in step SP13. In FIG. 7 and step SP12, the controller CO may switch the second light emitting unit 43 that emits the second light having the highest intensity to another second light emitting unit 43. As a result, the relative position of the region 110 after the movement in the additional light distribution pattern 103 may move to the left. Then, in FIG. 8 and step SP13, the controller CO may control the actuator 50 to change the direction of the second light emitted from the second light source unit 40 and move the additional light distribution pattern 103 to the right. Alternatively, when the controller CO switches the second light emitting unit 43 in step SP12, the relative position of the region 110 after the movement in the additional light distribution pattern 103 may move to any one of the following directions: upper, right, upper right, lower right, lower left, and upper left. In this case, in step SP13, the controller CO may control the actuator 50 to change the direction of the second light emitted from the second light source unit 40, and move the additional light distribution pattern 103 to any one of the following directions: down, left, lower left, upper left, upper right, and lower right.

In step SP12, the controller CO may switch the first light emitting unit 23 that emits the first light having the highest intensity to another first light emitting unit 23 similarly to the second light emitting unit 43. In addition, in step SP13, the controller CO may control the actuator 30 to change the direction of the first light emitted from the first light source unit 20 similarly to the actuator 50, and move the low beam light distribution pattern 101 similarly to the additional light distribution pattern 103.

Although the present invention has been described with reference to the above-described embodiment as an example, the present invention is not limited thereto.

The order of steps of the control flow is not particularly limited, and some steps may be performed simultaneously. In addition, the controller CO may gradually, stepwise, or instantaneously move the directions of the first light source unit 20 and the second light source unit 40.

The controller CO performs the temperature derating based on the duty ratios, and may perform the temperature derating based on a current flowing through the second light emitting units 43. Therefore, the controller CO may perform the temperature derating based on the power supplied to the plurality of second light emitting units 43.

The outer cover 12 does not have to be provided in the first casing 21 and the second casing 41. In the present embodiment, the inclinations of the second light source unit 40 in the vertical and horizontal directions are changed by one actuator 50, but two actuators 50 may be provided. One actuator 50 of the two actuators 50 may change the inclination of the second light source unit 40 in the vertical direction, and the other actuator 50 may change the inclination of the second light source unit 40 in the horizontal direction. Furthermore, the actuator 50 may be connected to the second circuit board 45 or an optical member such as a reflector or a projection lens. Then, the actuator 50 may move the second circuit board 45 and the optical member to adjust a relative position and a relative angle of one of the second circuit board 45 and the optical member with respect to the other one of the second circuit board 45 and the optical member. As the second circuit board 45 moves, the second light emitting unit 43 mounted on the second circuit board 45 also moves. By such adjustment, the actuator 50 may adjust the direction of the second light emitted from the second light source unit 40. Although the actuator 50 has been described above, the actuator 30 may have the same configuration as the actuator 50. The first light emitting unit 23 and the second light emitting unit 43 may be arrayed in the horizontal direction.

According to the present invention, a vehicle headlight capable of achieving uniformization of lifespans of light emitting units and suppressing discomfort felt by a driver can be provided and can be used in the field of automobiles and the like.

The invention claimed is:

1. A vehicle headlight comprising:
a light source unit that includes a plurality of light emitting units that emit light for forming a light distribution pattern to a front of a vehicle;
an actuator that adjusts a direction of the light emitted from the light source unit; and
a controller,
wherein the controller switches the light emitting unit that emits the light having a highest intensity to another light emitting unit, and controls the actuator to change the direction of the light emitted from the light source unit in such a way that a region where the intensity of the light is highest in the light distribution pattern after the switching approaches a region where the intensity of the light is highest in the light distribution pattern before the switching.

2. The vehicle headlight according to claim 1, wherein the controller switches the light emitting unit that emits the light having the highest intensity to another light emitting unit when performing temperature derating on the light source unit based on a temperature of the light source unit.

3. The vehicle headlight according to claim 1 or 2, wherein
the controller switches the light emitting unit that emits the light having the highest intensity to another light emitting unit that is located farther away from the light emitting unit as a temperature of the light source unit is higher.

4. The vehicle headlight according to claim 1 or 2, wherein
the plurality of light emitting units are arranged in a matrix, and
the light forms an additional light distribution pattern to be added to a low beam light distribution pattern to form a high beam light distribution pattern.

* * * * *